US008411979B2

(12) United States Patent
Zhao et al.

(10) Patent No.: US 8,411,979 B2
(45) Date of Patent: Apr. 2, 2013

(54) DIGITAL IMAGE PROCESSING AND ENHANCING SYSTEM AND METHOD WITH FUNCTION OF REMOVING NOISE

(75) Inventors: Yuming Zhao, Shanghai (CN); Jiapeng Liu, Shanghai (CN); Yanfeng Xiao, Shanghai (CN); Feng Shen, Shanghai (CN); Masaki Suwa, Kyoto (JP); Masatoshi Kimachi, Kyoto (JP)

(73) Assignees: Omron Corporation, Kyoto (JP); Shanghai Jiaotong University, Shanghai (CN)

( * ) Notice: Subject to any disclaimer, the term of this patent is extended or adjusted under 35 U.S.C. 154(b) by 410 days.

(21) Appl. No.: 12/670,625

(22) PCT Filed: Jul. 28, 2008

(86) PCT No.: PCT/CN2008/001382
§ 371 (c)(1),
(2), (4) Date: Jul. 20, 2010

(87) PCT Pub. No.: WO2009/012659
PCT Pub. Date: Jan. 29, 2009

(65) Prior Publication Data
US 2010/0303372 A1 Dec. 2, 2010

(30) Foreign Application Priority Data

Jul. 26, 2007 (CN) .......................... 2007 1 0044216
Jul. 26, 2007 (CN) .......................... 2007 1 0044217

(51) Int. Cl.
*G06K 9/40* (2006.01)
*H04N 1/407* (2006.01)

(52) U.S. Cl. ....................................... 382/254; 358/3.27

(58) Field of Classification Search .................. 382/173, 382/199, 254, 260, 284, 305, 312, 274–275; 356/3.01; 345/426, 611, 647; 358/3.26, 358/3.27, 463
See application file for complete search history.

(56) References Cited

U.S. PATENT DOCUMENTS 6,025,905 A * 2/2000 Sussman ...................... 356/3.01
6,941,028 B2 9/2005 Kimmel et al.
(Continued)

FOREIGN PATENT DOCUMENTS

| CN | 101102398 A | 1/2008 |
| CN | 101102399 A | 1/2008 |
| JP | 05-136998 | 6/1993 |
| JP | 2007-088913 | 4/2007 |

OTHER PUBLICATIONS

Kimmel, Ron, et al.; A Variational Framework for Retinex; International Journal of Computer Vision vol. 52 No. 1, 7-23, 2003; pp. 7-23; Kluwer Academic Publishers, The Netherlands.

(Continued)

*Primary Examiner* — Kanjibhai Patel
(74) *Attorney, Agent, or Firm* — Foley & Lardner LLP

(57) ABSTRACT

The present invention provides a digital image processing enhancing system and method with denoising function. The collected digital image is input; the obtained digital image is decomposed into an illumination image and a reflection image, and then the decomposed illumination image and the reflection image is processed, at last, the processed illumination image and the reflection image are composed into an output image, which is output to an output device. The present invention can improve the image quality, remove the noises of the image, remain details features of an object and obtain the natural visual effect.

20 Claims, 4 Drawing Sheets

U.S. PATENT DOCUMENTS

| | | | |
|---|---|---|---|
| 7,218,324 B2 * | 5/2007 | Pfister et al. | 345/426 |
| 7,433,540 B1 * | 10/2008 | Schuster | 382/284 |
| 7,596,266 B2 * | 9/2009 | Maxwell et al. | 382/167 |
| 7,747,045 B2 * | 6/2010 | Chinen et al. | 382/118 |
| 7,873,219 B2 * | 1/2011 | Friedhoff | 382/199 |
| 2007/0071350 A1 | 3/2007 | Lee et al. | |

OTHER PUBLICATIONS

Wang, Xiao-Li, et al.; Retinex Image Enhancement Method Based on Robust Estimation; Computer Applications vol. 26 No. 7, Jul. 2006; pp. 1611-1613.

Wang, Yan-Chen, et al.; Enhancement of Radiography Based Multiscale Retinex; Optics and Precision Engineering, vol. 14 No. 1, Feb. 2006; pp. 70-76; China Academic Journal Electronic Publishing House, China.

Jiang, Xing-Fang, et al.; Advancement of Study in Retinex Theory of Color Image Enhancement; Optical Technique vol. 31 Suppl., Sep. 2005; pp. 258-260 and 263.

Li, Xue-Ming; Image Enhancement Algorithm Based on Retinex Theory; 2005; pp. 235-237; China Academic Journal Electronic Publishing House, China.

Japanese Office Action (Notice of Grounds of Rejection) for Japanese application No. 2010-517255 dated Jan. 10, 2012, with translation.

* cited by examiner

DIGITAL IMAGE PROCESSING AND ENHANCING SYSTEM AND METHOD WITH FUNCTION OF REMOVING NOISE

FIELD OF THE INVENTION

The present invention relates to an image processing system in the technical field of digital images, specifically, to a digital image processing enhancing system with denoising function. On the other hand, the present invention also relates to an image processing method in the technical field of digital images, specifically, to a digital image processing enhancing method with denoising function.

BACKGROUND

With popularization of the digital cameras, the digital images occupy more and more important position in manufacture and life. Especially, in manufacture automation, the digital images have important functions on target identification and target trace, etc. However, since the defects of the imaging technology itself, qualities of the digital images are affected such that the applications of digital images are restricted.

In real life, the brightness dynamic scope is very large, mainly affected by environment illumination, there is a difference of several orders of magnitude between the brightness under the direct irradiation of the sun and the brightness in the shadow. The dynamic scope of the digital cameras is much less relatively, and the most often used 8-bits image depth only represents 256 brightness orders. In different illumination conditions, the vision systems of human may remove influence of the illumination by the adjustment of the size of pupil and process of retina and cortex of cerebra, to identify an object correctly. However, cameras do not possess such a self-regulating function. Therefore, in a case that the illumination condition is bad (too dark or too bright), the interested objects can not be identified on the images, such that the quality of images is deteriorated greatly.

General methods for solving this problem are gray scale equalization or Gamma correction. However, these two processing methods both are the global processing methods, and the local information is ignored. Therefore, although the illuminations are improved after enhancing the image by the above methods, the local image details may be lost. Comparatively, the present invention is based on the Retinex model, and removes the influence of the illumination from the input image by decomposing the input image into an illumination image and a reflection image, so that it can improve illumination effects in the output images, and meanwhile protects the local image details in the input image well.

After searching the literature of the prior arts, it was found that an article of "A Variational Framework for Retinex" in "International Journal of Computer Vision" (page 7-23, vol. 1, 52, in 2003) by Ron. Kimmel, Michael Elad, etc. It provided an image enhancing system and method based on the Retinex model, specifically, firstly collecting an input image and then decomposing the input image into an illumination image and a reflection image. This image decomposing method is completed by the following manners: according to the Retinex model, any image can be decomposed into a product of the illumination image and the reflection image. The core of image decomposing is the estimation of the illumination image, i.e., the forecast of the environment illumination. Based on three restrictions mentioned in the Retinex variational model: the illumination image is smooth in the space field, a pixel value of the illumination image is larger than a pixel value of the input image, and the illumination image and the input image are close enough, the forecast of the environment illumination estimates the environment illumination components, obtains a very smooth image as a forecast of the illumination image, and then obtains the reflection image from the relationships between the input image and the illumination image, the reflection image. After the image is decomposed into the illumination image and the reflection image, the illumination image of the input image is processed separately. The visibility of regions with bad illumination in original images, and the quality of images are improved by the non-linear correction (such as: processes of Gamma correction, gray scale equalization, logarithmic transformation, exponential transformation, subsection linear mapping, etc) for the pixel values of the illumination image according to the application requirements. The attached FIG. 1 shows a schematic block diagram of the image enhancing system in the "Variational Framework for Retinex".

The shortages of the above system and method are: although the illumination effect in the input image can be improved, the noises in the input image are improved while the image details contents are improved. Therefore, for the input image including a lot of noises originally, the quality of the output image may be worse than that of the input image. The influence of the noises on the quality of output image can not be avoided while enhancing the image details.

SUMMARY OF THE INVENTION

The purpose of the present invention is to overcome the defects of the influence of environment illumination conditions on the digital images in the prior arts. To achieve this purpose, the present invention provides a digital image processing enhancing system and method with denoising function. According to the present invention, it can automatically estimate the environment illumination conditions according to the input image and automatically adjust the image according to the illumination. The images obtained in the different illumination conditions can be adjusted to be in a brightness range with best visibility according to the information of the images within the dynamic range (usually be 0-255) of the digital cameras, so as to improve the illumination effect in the output image and enhance the local image details. The present invention may be applied to a pre-process stage for improving the quality of image forming of the digital cameras and based on the industry automation of the digital images.

The present invention provides a digital image processing enhancing system with denoising function. The system is achieved by the following technical solution, including five modules: an input module, an image decomposing module, an illumination image processing module, a reflection image processing module, a composing and outputting module. The input module collects an digital image as a system input, and the obtained digital image is input into the image decomposing module; the image decomposing module decomposes the input image into an illumination image L and a reflection image R, and they are input into the illumination image processing module and the reflection image processing module; the illumination image processing module performs a non-linear correction process on the illumination image L of the input image and outputs the corrected illumination image L'; the reflection image processing module performs the denoising process on pixels corresponding to the excessive dark regions in the reflection image R, and outputs the denoised reflection component R', wherein the excessive dark regions of the input image can be determined by the information of the illumination image; then the composing and outputting unit composes the L' and R' output from the former two modules and outputs the image to an output device.

Wherein, the input module of the present invention is: a module which collects the digital image; the digital image is a frame of a image obtained from a digital camera and a digital scanner and a serial image provided by a digital video camera.

The image decomposing module of the present invention is: a module which decomposes the input image in real time, and provides two outputs, including an illumination image corresponding to the illumination component of the input image and a reflection image corresponding to the reflection component of the input image, respectively. The above decomposing the input image in real time is the actualization of the Retinex model. According to the Retinex model, any image can be decomposed into a product of the illumination image and the reflection image. The core of decomposing image is the estimation of the illumination image, that is, the forecast of the environment illumination. Based on three restrictions of the Retinex variational model: the illumination image is smooth in space field, a pixel value of the illumination image is larger than a pixel value of the input image, and the illumination image and the input image are dose enough, the forecast of the environment illumination estimates the environment illumination components. A multiple resolutions technology is applied, that is, a smooth filtering (such as Gauss filtering, mean filtering and so on) is applied in each resolution layer to obtain the information of low frequency of the image. The sharpening (such as sharpening methods of Laplace sharpening, grads sharpening and so on) is applied to obtain the information of high frequency of the image. A very smooth image is obtained as a forecast of the illumination image, by removing the information of high frequency of the image and reserving the information of lower frequency of the image continually, then the reflection image is obtained from the relationships between the input image and the illumination image, the reflection image.

The illumination image processing module of the present invention is: a module which processes the illumination image of the input image separately, in the input image with bad illumination, the distribution of the gray scale of the illumination image often concentrates at a small part in the image dynamic range, the process for the illumination image is a non-linear correction process, a contrast of pixels positioned in lower end and upper end of the image dynamic range is improved by a non-linear mapping relationship, such that details of this part can be shown.

The non-linear correction process of the present invention may be a Gamma correction.

The reflection image processing module of the present invention is: a module which identifies the excessive dark regions of the input image in the illumination image and denoises and filters the regions corresponding to the reflection image of the input image. The reflection image includes the information of high frequency of the image. Most noises of the image concentrate to the reflection image after image decomposing. The illumination image basically does not include the noises. Therefore, the denoising and filtering process is necessary to be applied on the reflection image of the input image. The denoising and filtering is: the excessive dark regions of the input image are identified by analyzing the gray scale of the illumination image, and these regions are filtered on the reflection image. The identifying the excessive dark regions of the input image is: a threshold value with best effect is selected according to experiments, the gray scale of pixel of the illumination image is applied a binaryzation process, a pixel whose gray scale is less than the threshold value is marked as 1, and a pixel whose gray scale is larger than the threshold is marked as 0, such that region marked as 1 is the excessive dark region which needs to be denoised and filtered.

A method of local bilateral filtering may be used as the denoising and filtering process. The experiment analysis may determine that the most of the noises in the output images corresponds to the excessive dark regions of the input image. Thus, these regions may be identified by analyzing the gray scale of the illumination image, and the denoising and filtering process is applied to these regions on the reflection image, such that most noises may be removed effectively to satisfy the requirements of processing in real time in the condition where only a little process time is increased.

The composing and outputting module in the present invention is: a module which re-composes the separately processed illumination component and the reflection component in the same output image according to the known relationship and outputs the output image. The output image may be output as a picture through a photo printer or be shown directly on other display device such as a display of a computer, etc.

The input module of the present invention collects an digital image as the system input, the obtained digital image is input into the image decomposing module; the image decomposing module decomposes the input image into two outputs: an illumination image L and a reflection image R, and they are input into the illumination image processing module and the reflection image processing module, respectively; the illumination image processing module performs the non-linear correction process on the illumination image L of the input image and obtains the corrected illumination image L'; the reflection image processing module firstly determines the denoising region according to the illumination image, and then applies the denoising and filtering process on the pixel in the denoising region of the reflection image, and outputs the denoised reflection component R'; the composing and outputting unit composes the L' and R' output from the former two modules and outputs the image to an output device.

Meanwhile, the present invention also provides a digital image processing enhancing method with denoising function. The method is achieved by the following technical solution. Firstly, a digital image is read; color and gray scale value of each pixel is stored into the distributed memory region, then the input image is decomposed into two parts, a illumination image and a reflection image; next, the illumination image and the reflection image are processed respectively, at last, the processed reflection image and illumination image are composed in the output image and the output image is output to an output device.

In the present invention, storing the input image into the distributed memory region is: a memory region with a size equivalent to the size of the image is applied, each pixel value of the input image is stored into a memory unit corresponding to the memory region in turn, if the input image is a color image, the color image will be divided into three channels of R, G, B which are stored respectively.

In the present invention, decomposing the input image into the illumination image and the reflection image is: according to the Retinex model, any image can be decomposed into a product of the illumination image and the reflection image. The core of image decomposing is the estimation of the illumination image, that is, the forecast of the environment illumination. Based on three restrictions of the Retinex variational model: the illumination image is smooth in space field, a pixel value of the illumination image is larger than a pixel value of the input image, and the illumination image and the input image are close enough, the forecast of the environment illumination estimates the environment illumination components. A multiple resolutions technology is applied, that is, a smooth filtering (such as Gauss filtering, mean filtering and so on) is applied in each resolution layer to obtain the information of lower frequency of the image. The sharpening (such as sharpening methods of Laplace sharpening, grads sharpening and so on) is applied to obtain the information of high frequency of the image. A very smooth image is obtained as a forecast of the illumination image by removing the information of high frequency of the image and reserving the information of lower frequency continually, and then the reflection image is obtained from the relationship between the input image and the illumination image, the reflection image.

In the present invention, processing the illumination image is: the original illumination image is applied the non-linear correction process, that is, the non-linear mapping curve is used to increase the contrast of the excessive bright and dark regions and improve visibility of image contents in the excessive bright and dark regions.

In the present invention, the method of non-linear correction process applied on the original illumination image may be the Gamma correction. The Gamma curve is used as a mapping curve to extend the contrast of the excessive bright and dark regions and improve the visibility of image contents in the excessive bright and dark regions.

In the present invention, processing the reflection image is: the excessive dark regions of the input image is identified from the illumination image and denoises and filters a region corresponding to the reflection image of the input image. The denoising and filtering process is: since the reflection image includes the high frequency information in the original image, and meanwhile the visibility of the excessive dark information and the noises in the input image are low, most of the decomposed noises of the image concentrate to a region of the reflection image corresponding to the excessive dark region of the input image, the excessive dark region of the input image is identified from the illumination image, the region of the reflection image corresponding to the excessive dark regions is denoised and filtered by applying the denoising and filtering process.

In the present invention, the denoising and filtering process may be a local bilateral filtering, that is, the regions required to be filtered, i.e., dark regions of the input image, are dynamically determined, according to information on the illumination image. Meanwhile, a bilateral denoising and filtering is performed in the reflection image according to the identified excessive dark regions on the illumination image. The edge information may be reserved completely, and the noises on both sides of the edge may be removed by the smooth filtering.

In the present invention, the identifying the excessive dark regions of the input image from the illumination image is: a threshold value with best effect is selected according to experiments, the gray scale of pixel of the illumination image is applied the binaryzation process, a pixel whose gray scale is less than the threshold value is marked as 1, and a pixel whose gray scale is larger than the threshold value is marked as 0, such that a region marked as 1 is the excessive dark regions which needs to be denoised and filtered.

In the present invention, the local bilateral filtering is a technology of denoising in a image space field and image gray scale field respectively; when an edge of an object is met, under the influence of the range filtering, the pixel values on both sides of the edge will not affect each other, but be smoothly filtered in the space field on its own side, respectively.

In the present invention, the composing the illumination image and the reflection image into an output image is: according to a principle that any image can be decomposed into a product of the illumination image and the reflection image, the output image is obtained by multiplying pixel values of pixel corresponding to new and processed illumination image and reflection image, respectively. The formats of the input image and the output image are the same. They may be output to a general output device such as a digital photo printer and computer displaying, etc.

In the present invention, firstly a digital image is read and color and gray scale value of every pixel is stored into the distributed memory region; then the input image is decomposed into two parts: a illumination image and a reflection image; next, the two parts are processed respectively; the illumination image is applied the non-linear correction process to improve the illumination effect, and the reflection image is denoised and filtered according to the filtering regions obtained on the illumination image so as to denoise; at last, the processed reflection image and illumination image are composed in an output image, and the output image is output to an output device.

According to the digital image processing enhancing system and method with denoising function of the present, it can not only improve qualities of the shooting images under a circumstance with bad illumination, adjust the illumination effect of the input image, and improve the visibility of the contents of the input image, but also satisfy the requirements of processing in real time. As compared with the general global image enhancing method, such as Gamma correction and gray scale equalization, it can remain local image details can be reversed better, numbers of effective feature points in the images can be increased, so that it may be widely used in life and manufacture. Additionally, in the present invention, an operation of denoising in the noises concentrating regions of the reflection image based on the image enhancing system of the Retinex model is added, and the problem of increasing noises amounts during image enhancing progress of the Retinex arithmetic is improved greatly without affecting the condition of real time of the system.

DETAILED DESCRIPTION OF THE INVENTION

An embodiment of the present invention will now be described in detail with reference to the drawings. The present embodiment is implemented based on the technical solution of the present invention and provides a particular implementing manner. However, the protective scope of the present invention is not limited by the following embodiment.

Figure 2:
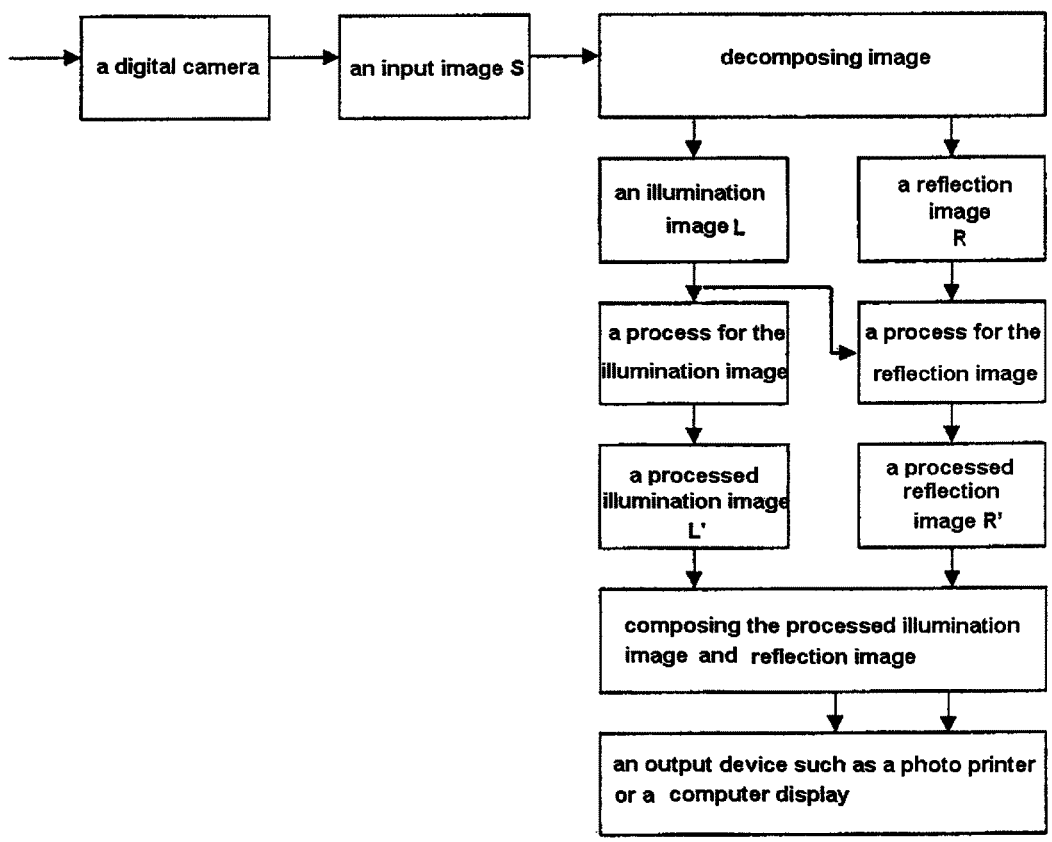
FIG. 2 is a schematic block diagram of a digital image enhancing system according to the present invention.

As shown in FIG. 2, the embodiment of the digital image processing enhancing system according to the present invention includes five modules: an input module, an image decomposing module, an illumination image processing module, a reflection image processing module and a composing and outputting module. The five modules are implemented by an input device (a digital camera), a computer software processing program and an output device (a photo printer or a computer display, etc). The input module collects digital images. The output of the input module is connected to the input of the image decomposing module; two outputs of the image decomposing module: an illumination image and a reflection image are inputs of another two modules: an illumination image processing module and a reflection image processing module, respectively; the outputs of the illumination image processing module and reflection image processing module are two inputs of the composing and outputting module.

The input module may be implemented by an conventional input device, such as a general digital camera, a digital video camera or a scanner. The output of the input module may be a digital image (such as bmp, jpeg, etc.) in a general format.

The image decomposing module decomposes the digital image obtained from the input module into two images: an illumination image and a reflection image. According to the Retinex model, any image can be decomposed into a product of the illumination image and the reflection image. The core of image decomposing is the estimation of the illumination image. In the present invention, the estimation of the illumination image is based on the Retinex model. A result of a smooth filter (in the preferred embodiment of the present invention, the Gauss filtering is used to perform the smooth filter. However, other methods for filtering such as a mean filtering learnt by a person skilled in the art may also be used in the present invention) of the image is reserved, and a result of sharpening (in the preferred embodiment of the present invention, the Laplace sharpening is used as a method of sharp. However, other methods for sharpening, such as a grads sharp learnt by a person skilled in the art may also be used in the present invention) of the image is removed on each resolution layer, using a multiple resolutions technology. After several times of iteration, a smooth image as an estimation of the illumination image of the illumination image is obtained. The reflection image is obtained through dividing the input image by the illumination image.

The illumination image processing module mainly adjusts the illumination conditions of the input image so as to achieve the object of improving the illumination effect of the output image. As for the non-linear correction process of the illumination image, as employed in the present invention, a non-linear mapping curve is used to increase the contrast of the excessive bright and dark regions, so as to improve the illumination effect and visibility of the two regions with a bad illumination.

The reflection image processing module mainly removes noises from local regions of the reflection image. The denoising process for processing the noises of the image based on the Retinex mainly focus on the excessive regions of the input image. At first, a preferred threshold value is selected according to the experiment experience. A binaryzation process is performed on the illumination image of the input image, the region whose gray scales is less than the threshold value is marked as 1, and the region whose gray scale is large than the threshold value is mark as 0. The region marked as 1 is the excessive dark region on which the denoising process needs to be applied. Then, each pixel of the reflection image is judged whether it is in the excessive regions or not, according to the binaryzation image. If it is in the excessive region, the filtering process is performed to remove the noises.

Preferably, in the present embodiment, the employed method for removing the noises and filtering is a local bilateral filtering process. However, any other filter methods (such as a mid-value filtering, an mean filtering, a low-pass filtering, an anisotropic filtering, etc) may also be used to denoise and filter the reflection image in the present invention.

It can be known from the above descriptions that most of the noises concentrate in the reflection image after the input image has been decomposed. It can be determined from the experiment analysis that most of the noises of the output image correspond to the excessive dark regions of the output image. By filtering these regions on the reflection image, instead of the whole image, it can not only remove most of the noises effectively, but also save a great deal of processing time to satisfy the requirements of processing in real time. The regions required to be filtered, that is, dark regions of the input image, may be determined dynamically from the information in the illumination image. At the same time, the bilateral filtering and denoising is performed in the reflection image according to the excessive dark regions identified on the illumination image, the edge information may be reserved completely and the noises on both sides of the edge are removed by the Gauss filtering. As compared with the general filtering methods, such as the global filtering methods of a mean filtering, a mid-value filtering and a Gauss filtering, the usage of the above local bilateral filtering method may save more processing time to obtain requirements of processing in real time. Therefore, in the preferred embodiment of the present invention, the local bilateral filtering is employed, which can save a great deal of time as compared with the general global filtering.

According to a principle of relationship that the input image is a product of the illumination image and the reflection image, the composing and outputting module multiplies and composes the illumination image and the reflection image that are processed by the illumination image processing module and the reflection image processing module respectively to obtain an output image. Then the output image is output to an output device. The output device may be a digital photos printer, a computer display, etc.

Figure 1:
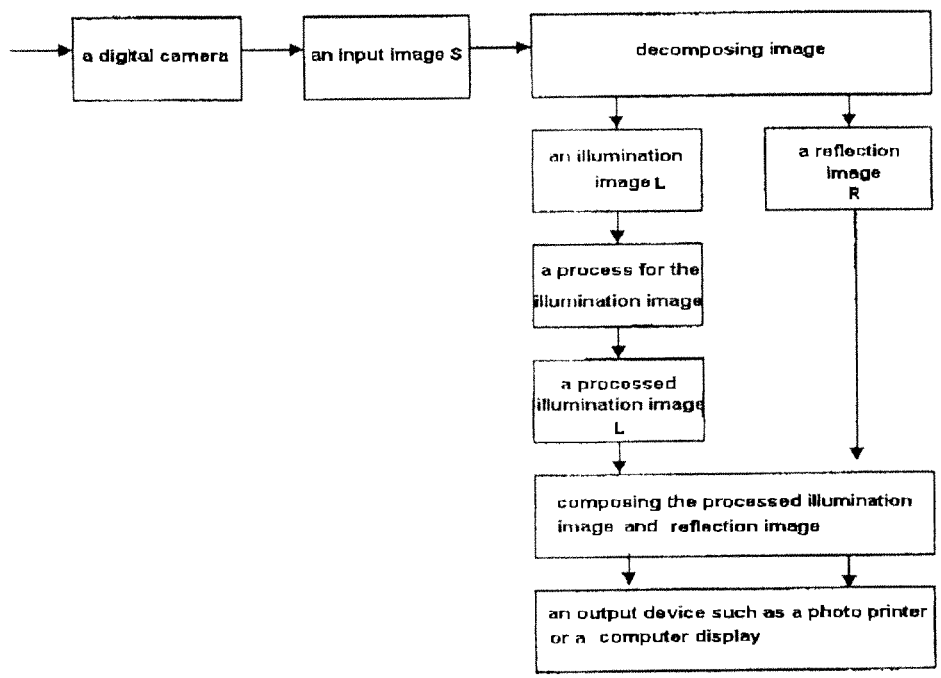
FIG. 1 is a schematic block diagram of image enhancing system in "a variational framework for Retinex" in prior art.

As compared with the image enhancing system of the prior art (as shown in FIG. 1), in the present embodiment, using the local bilateral filtering to denoise and filter the reflection image is added, which suppresses bad influences of the noises on the quality of the output image during image enhancing. Meanwhile, since the technology of the local bilateral filtering is employed, a great deal of processing time is saved and the requirements of processing in real time are satisfied by the present embodiment.

Next, the embodiment of the digital image processing enhancing method according to the present invention will be described with reference to FIGS. 3 and 4. According to the digital image processing enhancing method of the present invention, an input image are firstly read, and then the input image is decomposed into two parts: an illumination image and a reflection image; next, the illumination image is non-linearly corrected and excessive regions are extracted from the illumination image before correction, the corresponding regions of the reflection image is denoised and filtered by the local bilateral filtering; at last, the processed illumination image and the reflection image are multiplied to compose an output image, and the output image is output. The whole process is in real time and self-adaptive without setting any parameters by users.

Preferably, in the embodiment, the non-linear correcting process is that the illumination image is processed by the Gamma correction method, but other non-linear correction methods, for example, gray scale equalization, logarithm transformation, exponential transformation, subsection linear mapping, etc, can be used in the present invention as the non-linear correction methods.

Figure 3:
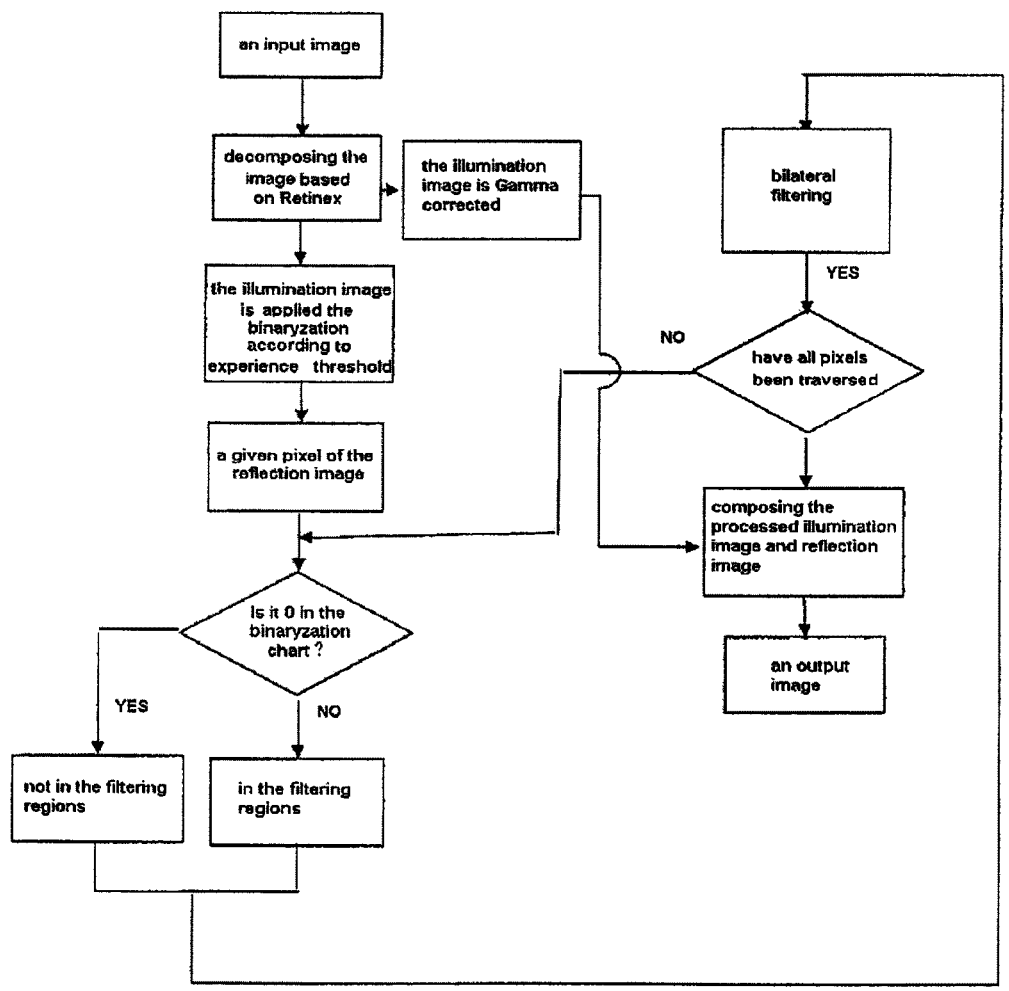
FIG. 3 is a processing flow chart of an embodiment of a digital image enhancing method according to the present invention.

As shown in FIG. 3, in the present embodiment, users firstly start a real-time image enhancing system, operate a file selection button to open an image to be enhanced, and operate an enhancing button to enhance the input image.

Next, the image enhancing program decomposes the input image according to the Retinex model, and decomposes the input image into the illumination image and the reflection image. The Gamma correction is performed on the illumination image by the program to obtain the processed illumination image. A threshold value is selected by the program according to the experiments so as to perform the binaryzation on the illumination image. The pixel whose gray scale is bigger than the threshold value is marked as 0, i.e. a bright region of the input image, which is not required to be filtered; whereas the pixel whose gray scale is smaller than the threshold value is marked as 1, i.e. an excessive dark region of the input image which is required to be filtered.

When the reflection image is processed, the pixels in the reflection image are selected one by one. As compared with the binaryzation image obtained by the illumination image before, if the pixel at a corresponding position in the binaryzation image is 0, it will not be processed; and if the pixel at a corresponding position in the binaryzation image is 1, it will be applied the local bilateral filtering. Then, it is judged whether each pixel in the illumination image has been traversed. If not, a next pixel is sequentially selected.

When each pixel in the illumination image has been traversed, the processed illumination image and the reflection image are finally re-multiplied with each other to compose in an output image, and displayed in a program window.

Figure 4:
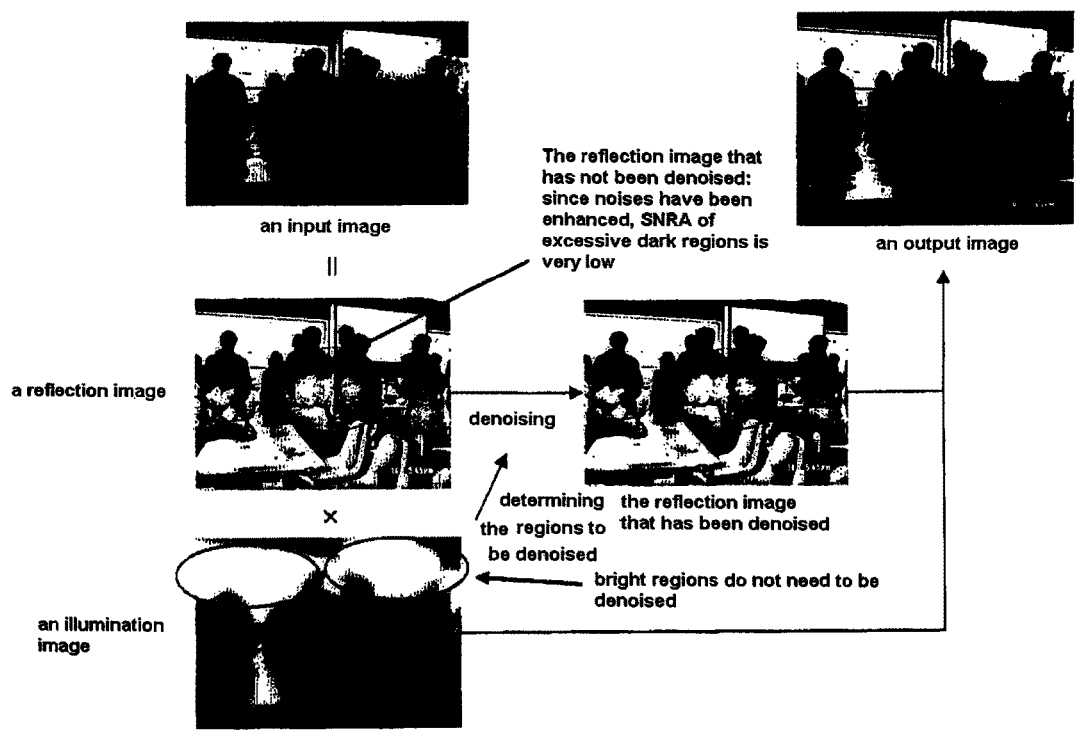
FIG. 4 is a schematic of an application example of a digital image enhancing method according to the present invention.

As shown in FIG. 4, in the present embodiment, the input image is decomposed into the illumination image and the reflection image according to the Retinex model. Before the denoising process, since the image noises of the excessive dark regions have been enhanced, the signal noise ratio at a position corresponding to excessive dark regions on the reflection image is very low. These excessive dark regions are identified from the illumination image as denoising regions. The bilateral filtering is performed locally on the reflection image. The regions with high noises are made be smooth in the condition of reserving edge. Then, the Gamma corrected illumination image and the denoised reflection image are composed in an output image. Comparing the output image with the input image, the illumination effect is improved greatly, and contrast of image details is increased greatly. Meanwhile, the noises can be suppressed effectively. The above processes are completed in real time.

The invention claimed is:

1. A digital image processing enhancing system with denoising function, wherein,
    the system includes five modules: an input module, an image decomposing module, an illumination image processing module, a reflection image processing module, a composing and outputting module, wherein:
    the input module is configured to collect a digital image as a system input, an obtained digital image is input into the image decomposing module,
    the image decomposing module is configured to decompose the input image into an illumination image L and a reflection image R, which are input into the illumination image processing module and the reflection image processing module respectively,
    the illumination image processing module is configured to perform a non-linear correction on the illumination image L of the input image and outputs a corrected illumination image L',
    the reflection image processing module is configured to perform a denoising and filtering process on pixels corresponding to excessive dark regions in the reflection image R, and outputs a denoised reflection image R', wherein the excessive dark regions of the input image can be determined by an information of the illumination image, and is configured to identify the excessive dark regions of the input image in the illumination image and denoise and filter regions corresponding to the reflection image of the input image, then the composing and outputting module is configured to re-compose the L' and R' output from the former two modules in an output image and outputs to output the output image to an output device.

2. A digital image processing enhancing system with denoising function according to claim 1, wherein, the input module is: a module which is configured to collect the digital image; the digital image is a frame of an image obtained from a digital camera and digital scanner and a serial image provided by a digital video camera.

3. A digital image processing enhancing system with denoising function according to claim 1, wherein, the image decomposing module is: a module which is configured to decompose the input image in real time, is configured to provide two outputs including the illumination image corresponding to an illumination component of the input image and the reflection image corresponding to a reflection component of the input image, respectively.

4. A digital image processing enhancing system with denoising function according to claim 3, wherein, the decomposing the input image in real time is: based on three restrictions of a Retinex variational model: the illumination image is smooth in space field, a pixel value of the illumination image is larger than the input image, and the illumination image and the input image are close enough, a forecast of environment illumination estimates the illumination components of the input image, a multiple resolutions technology is applied, in each resolution layer, results of smoothing are reserved, results of sharpening are removed, a smooth image as an estimation of the illumination image is obtained, then the reflection image is obtained from the relationships between the input image and the illumination image, the reflection image.

5. A digital image processing enhancing system with denoising function according to claim 1, wherein, the illumination image processing module is: a module which is configured to process the illumination image of the input image separately, in the input image with bad illumination, a distribution of a gray scale of the illumination image often concentrates in a small part of an image dynamic range, a process for the illumination image is a non-linear correction process, a contrast of pixels positioned at a lower end and upper end of the image dynamic range is improved by a non-linear mapping relation, such that details of said part can be shown.

6. A digital image processing enhancing system with denoising function according to claim 5, wherein, the non-linear correction process is a Gamma correction.

7. A digital image processing enhancing system with denoising function according to claim 1, wherein, the denoising and filtering is: the excessive dark regions of the input image are identified by analyzing the gray scale of the illumination image, and these identified excessive dark regions are denoised and filtered on the reflection image.

8. A digital image processing enhancing system with denoising function according to claim 1, wherein, the denoising and filtering process is a local bilateral filtering process.

9. A digital image processing enhancing system with denoising function according to claim 1, wherein, the identifying the excessive dark regions of the input image is: a threshold value with a best effect is selected according to experiments, the gray scale of pixel of the illumination image is applied a binaryzation process, a pixel whose gray scale is less than the threshold value is marked as 1, and a pixel whose gray scale is larger than the threshold value is marked as 0, such that a region which is marked as 1 is the excessive dark region which needs to be denoised and filtered.

10. A digital image processing enhancing system with denoising function according to claim 1, wherein, the composing and outputting module is: a module that is configured to re-compose an illumination component and a reflection component being processed separately in a same input image according to known relationship, and to output the input image.

11. A digital image processing enhancing method with denoising function, comprising:
    reading a digital image;
    storing color and gray scale values of each pixel into distributed memory regions, and then decomposing the input image into two parts, an illumination image and a reflection image;
    processing the illumination image and the reflection image respectively; and
    composing a processed reflection image and a processed illumination image and outputting it to an output device,
    wherein the processing the reflection image includes:
    identifying the excessive dark regions of the input image from the illumination image, and performing a denoising: and
    filtering process by using a local bilateral filtering process on regions corresponding to the reflection image of the input image.

12. A digital image processing enhancing method with denoising function according to claim 11, wherein, storing the input image into the distributed memory regions comprises:
    applying a memory region with a size equivalent to a size of the image storing each pixel value of the input image into a memory unit corresponding to the memory region in turn, and if the input image is a color image, dividing the color image into three channels of R, G, B which are stored respectively.

13. A digital image processing enhancing method with denoising function according to claim 11, wherein, decomposing the input image into the illumination image and the reflection image comprises:
    decomposing the image into a product of the illumination image and the reflection image according to the Retinex model, wherein an estimation of the illumination image is based on a Retinex variational model, applying a multiple resolutions technology, in a corresponding resolution layer, reserving results of smoothing removing results of sharpening, after several times of iterations, obtaining a smooth image as an estimation of the illumination image of the illumination image, and obtaining the reflection image through dividing the input image by the illumination image.

14. A digital image processing enhancing method with denoising function according to claim 11, wherein, processing the illumination image comprises: in the input image with a bad illumination, a distribution of gray scale of the illumination image being concentrated in a small part of an image dynamic range, improving a contrast of pixels positioned in lower end and upper end of the image dynamic range by a non-linear correction process, such that details of said part can be shown.

15. A digital image processing enhancing method with denoising function according to claim 11, wherein, the non-linear correction process is a non-linear mapping curve, extending a gray dynamic scope of the excessive bright and dark regions and improving visibility of image contents in the excessive bright and dark regions.

16. A digital image processing enhancing method with denoising function according to claim 11, wherein, the non-linear correction process is a Gamma correction.

17. A digital image processing enhancing method with denoising function according to claim 11, wherein, the local bilateral filtering process comprises: when the reflection image includes high frequency information in an original image, and visibilities of excessive dark information and the noises in the input image are low, after decomposed, most of the noises of the image being concentrated in a region of the reflection image corresponding to the excessive dark region of the input image, identifying the excessive region of the input image from the illumination image, and denoising and filtering a region of the reflection image corresponding to the excessive region by a bilateral filtering.

18. A digital image processing enhancing method with denoising function according to claim 17, wherein, the bilateral filtering is a technology for denoising in an image space field and image gray scale field respectively;
    when an edge of an object is met, under the influence of a range filtering, pixel values on both sides of the edge will not affect each other, but a smooth filtering is applied in the space field on its own side, respectively.

19. A digital image processing enhancing method with denoising function according to claim 11, wherein, the identifying the excessive dark regions of the input image from the illumination image comprises:
    selecting a threshold value with best effect according to experiments, applying a binaryzation process to the gray scale of pixel of the illumination image, marking as 1 a pixel whose gray scale is less than the threshold value, and marking as 0 a pixel whose gray scale is larger than the threshold value, such that region marked as 1 is the excessive dark region which needs to be denoised and filtered.

20. A digital image processing enhancing method with denoising function according to claim 11, wherein, the composing the illumination image and the reflection image into an output image comprises: according to a principle that any image can be decomposed into a product of the illumination image and the reflection image, obtaining the output image by multiplying pixel values of pixel corresponding to a processed and new illumination image and reflection image, respectively.

* * * * *